US006783623B2

(12) United States Patent
Morin et al.

(10) Patent No.: US 6,783,623 B2
(45) Date of Patent: Aug. 31, 2004

(54) METHOD OF MAKING A DRY BONDED PAPERBOARD STRUCTURE

(75) Inventors: Jeremy E. Morin, Florence, SC (US); Krishnaraju Varadarajan, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 154 days.

(21) Appl. No.: 10/065,487

(22) Filed: Oct. 23, 2002

(65) Prior Publication Data

US 2004/0079501 A1 Apr. 29, 2004

(51) Int. Cl.[7] .......................... B32B 31/24; D21H 27/30

(52) U.S. Cl. ............................... 156/275.5; 156/275.7; 162/132; 162/164.1

(58) Field of Search .......................... 156/272.2, 272.4, 156/275.5, 275.7; 162/132, 164.1; 219/678

(56) References Cited

U.S. PATENT DOCUMENTS

| | | | | |
|---|---|---|---|---|
| 3,274,905 | A | | 9/1966 | Demsey, Jr. et al. |
| 3,520,463 | A | | 7/1970 | Ahlemeyer |
| 3,555,946 | A | | 1/1971 | Carter et al. |
| 3,574,031 | A | | 4/1971 | Heller et al. |
| 4,296,294 | A | | 10/1981 | Becker et al. |
| 4,629,529 | A | | 12/1986 | Kadunce |
| 5,328,539 | A | | 7/1994 | Sato |
| 5,611,882 | A | * | 3/1997 | Riebel et al. ............ 156/272.2 |
| 5,661,201 | A | | 8/1997 | Degrand |
| 5,829,669 | A | | 11/1998 | Drummond et al. |
| 6,296,600 | B1 | | 10/2001 | Drummond et al. |
| 2003/0034117 | A1 | * | 2/2003 | Thomas et al. ............. 156/195 |

FOREIGN PATENT DOCUMENTS

| | | | |
|---|---|---|---|
| EP | 0888 877 | A1 | 1/1999 |
| EP | 0993 367 | B1 | 4/2002 |
| WO | WO 99/47621 | A1 | 9/1999 |
| WO | WO 01/21725 | A1 | 3/2001 |

* cited by examiner

*Primary Examiner*—Jeff H. Aftergut
*Assistant Examiner*—John T. Haran
(74) *Attorney, Agent, or Firm*—Clausen Miller, PC

(57) ABSTRACT

A method of making a spirally wound dry bonded paperboard structure. The method includes adding a radio frequency active adhesive to the paperboard pulp stock during the paperboard fabrication process to first produce an RF active adhesive impregnated paperboard. The impregnated paperboard is then exposed to an RF energy field prior to or during winding, which activates the adhesive. The invention eliminates the need to apply a water-based adhesive to the paperboard prior to forming the structure, thereby reducing water migration into the paperboard.

8 Claims, No Drawings

METHOD OF MAKING A DRY BONDED PAPERBOARD STRUCTURE

BACKGROUND OF THE INVENTION

This patent relates to a method of making a dry bonded paperboard structure. More particularly, this patent relates to a method of making a spirally wound paperboard container in which a radio frequency active adhesive is added to the pulp stock during the paperboard fabrication process.

Paperboard is one of two broad subdivisions of paper (general term), the other being paper (specific term). The distinction between paper and paperboard is not sharp, but, broadly speaking, paperboard is heavier, thicker, and more rigid than paper. For the purposes of this patent, the term "paper" shall include paperboard and the term "paperboard" shall include paper.

Paperboard can be used to make numerous structures, including spirally wound structures such as tubes, cores and cylindrical containers. In the manufacture of spirally wound containers, a web of paperboard is fed at a desired angle to a stationary mandrel to form the structural or bodywall layer of the container. Prior to being wound, a permanent heat sensitive adhesive is applied by a roller along a marginal edge of the paperboard web. The web is passed under a heater that softens the adhesive and makes it tacky. As the web is wound around the mandrel, the first marginal edge of the web advances back under the mandrel and is brought into contact with the opposing edge of the ensuing portion of the web. The edges become adhered to form a spirally wound tube, which can then be cut into desired lengths.

The heat sensitive adhesive is usually aqueous based, of which a few examples are vinyl acetate/ethylene copolymers, polyvinyl alcohol, polyvinyl acetate (a.k.a. "white glue"), dextrin, casein and acrylics. The problem with using aqueous based adhesives is that the water from the adhesive can migrate into the paperboard, potentially decreasing the mechanical properties of the paperboard, such as compression strength, tensile strength, tearing strength and folding endurance.

Drummond et al. U.S. Pat. No. 6,296,600 discloses a method of reducing the migration of water into the paperboard by using a foamed adhesive, which reduces the amount of adhesive that comes into contact with the paperboard. While this solution may be effective, there still exists a need for a method of making paperboard containers that reduces or eliminates the amount of water migrating into the paperboard and at the same time strengthens the paperboard.

This need is solved by the present invention through the use of radio frequency (RF) active adhesives and RF heating. As is well known in the art, radio frequency heating is a method used to generate heat directly within a material containing RF active components (susceptors), and indirectly within materials that are in thermally conductive contact with RF susceptors. RF susceptors are ionic or polar materials that have the ability to convert RF energy into thermal energy when exposed to an RF electromagnetic or electrical field.

As disclosed in International Patent Application Nos. WO 99/47621 and WO 01/21725, RF active adhesives (adhesives containing RF susceptors) can be used to adhere two or more layers of non-conducting substrates. Adhesion is accomplished by exposing an adhesive layer between the substrates to radio frequency energy in the range of from about 1 MHz to about 100 MHz, which induces dielectric current in the RF susceptor. The current generates thermal energy, which causes the adhesive to soften and adhere the adjoining substrates.

These and other patents describe methods of bonding adjacent substrates by coating one or both substrates with an RF active adhesive. What is heretofore not known is that two or more paperboard layers can be bonded by adding RF active adhesive to the paperboard pulp stock during the paperboard making process.

Thus it is an object of the present invention to provide a method of making a paperboard structure that reduces or eliminates the amount of water migrating into the paperboard.

Another object of the invention is to provide a method of making a spirally wound paperboard structure that eliminates the step of coating the paperboard web with adhesive prior to winding.

Yet another object of the invention is to provide a method of making a spirally wound paperboard structure that uses an RF active compound for adhesion.

Still another object of the invention is to provide a method of making a multiple ply paperboard suitable for dry bonding in which an RF active adhesive is added to the outer plies of the paperboard but not the inner plies.

Further and additional objects will appear from the description, accompanying drawings, and appended claims.

SUMMARY OF INVENTION

The present invention is a method of making a dry bonded paperboard structure by adding an RF active adhesive to the pulp stock during the making of the paperboard. The method comprises the steps of adding a radio frequency active adhesive to paperboard pulp stock; forming the pulp stock into a web or sheet; exposing the sheet to RF energy to generate heat sufficient to cause the adhesive in the sheet to soften; arranging one or more of the sheets in at least partially overlapping relationship; and allowing the adhesive to harden, thereby forming the multiple-ply paperboard structure. The method may be used to make spirally wound tubular structures such as tubes, cores and cylindrical containers. By eliminating the need to coat the paperboard with aqueous adhesive, the method reduces or eliminates the migration of water into the paperboard, thereby producing a stronger paperboard structure.

In an alternative embodiment, the paperboard comprises multiple plies, and the adhesive is added only to the pulp stock that is used to make the outer ply or plies.

DETAILED DESCRIPTION

The present invention is a method of making a dry bonded paperboard structures, especially spirally wound paperboard structures, by exploiting radio frequency heating technology. The method eliminates the step of coating the paperboard with an aqueous-based adhesive, thus the term "dry bonded." The method also serves to strengthen the paperboard by impregnating it with a radio frequency (RF) active adhesive.

In a key aspect of the invention, the RF active adhesive is added to pulp stock that is used to make the paperboard. The adhesive impregnated paperboard web is exposed to RF energy just prior to winding, softening the adhesive and allowing the layers of paperboard to bond to each other. After forming the sheet into the desired structure, the adhesive is allowed to set.

The method may be thought of as comprising the following steps: i. adding a radio frequency (RF) active adhesive to pulp stock; ii. forming the pulp stock into a paperboard sheet and allowing the sheet to dry; iii. exposing the adhesive-impregnated paperboard sheet to RF energy to generate heat sufficient to cause the adhesive in the sheet to soften; iv. arranging (winding) the sheet to form a paperboard structure; and v. allowing the adhesive to harden.

The mechanical properties of the paperboard, and thus the paperboard structure, depend on the type of adhesive used. One possible adhesive is polyvinyl acetate (PVA) dispersed or dissolved in a liquid carrier media. PVA has a dipole at the vinyl group that renders it RF active. Other possible adhesives include phenolic resins such as phenol-formaldehyde resin, ethyl vinyl acetate (EVA), melaminic resins such as melamine-formaldehyde resin, polyethylene terpthatate (PET), and silicones, although any suitable RF active adhesive or combination of adhesives may be used.

Although the adhesive of the present invention has been described as being “RF active”, it is to be understood that the adhesive may be activated by electromagnetic radiation having a frequency extending beyond the radio region (typically 3 Hz to 1 GHz) and into the microwave region (typically 3 GHz to 3 THz).

The primary benefit of the method is eliminating the step of coating the paperboard with water-based adhesive prior to winding and the associated migration of water into the paperboard. The invention also makes it easier to completely wet the paperboard fibers, since the RF active adhesive is distributed evenly throughout the paperboard, not just on the outer surface of the paperboard sheet. This further improves the mechanical properties of the paperboard, since paperboard has a relatively low, out-of-plane strength and modulus. The resulting paperboard has an enhanced flexural stiffness.

The invention works in the following manner. In the pulping stage of paper and paperboard making, cellulous fibers from wood and/or other sources are separated from each other and from other impurities such as lignin by either chemical or mechanical means, or a combination of both. Chemical pulping generally provides a pulp that is stronger and thus better suited for production of board grades where strength is important. Kraft paper is produced from a chemical pulping process known as the kraft process, in which the fibrous material is cooked in a solution of caustic soda. In German, the word “kraft” means “strength”. Mechanical pulping produces a high-yield pulp with high opacity and bulk, suitable for use as newsprint and other grades where these characteristics are desired. The present invention may be used with any type of pulping means.

The product of the pulping stage is a paste-like liquid referred to as pulp stock or furnish. Prior to being made into paper or paperboard, the pulp stock may be further treated to shape the fibers and remove any remaining contaminants. Chemical strength additives may be added to the pulp stock to improve fiber bonding. Other additives may be added to affect other properties of the paper, such as color, printing quality and alkalinity.

According to the invention, a radio frequency active adhesive is added to the pulp stock, preferably but not necessarily at the same time as the other additives are added. Adding the RF active adhesive to the pulp stock insures that the fibers are completely wetted with the adhesive, since the adhesive is distributed throughout the entire paperboard, not just on the outer surface. Any suitable RF active adhesive can be used, including aqueous based adhesives, since all or most of the water will be removed during the papermaking stage.

The next step of the invention is to form the pulp stock into a paperboard sheet according to conventional papermaking methods. In brief summary, the pulp stock containing the RF active adhesive is sent to a papermaking machine having a wet end, a press section, and a dryer section. At the wet end, the pulp stock (mainly fiber suspended in water) is deposited onto a loop of porous fabric, or “wire”. Water drains away through the porous fabric as the suspension moves toward the press section, leaving a wet, weak mat of fiber and additives, including the RF active adhesive.

In the press section, the sheet passes through a series of various sized opposing rollers. As the sheet passes through the pairs of rollers, more water is removed from the sheet. The sheet leaves the press section and enters the dryer section for final water removal. The final paper or paperboard sheet is then wound into rolls for storage and transport. The sheet or web of RF active adhesive impregnated paperboard is then ready to be used to make paperboard structures such as wound paperboard tubes, cores and containers.

Paperboard frequently is a composite of multiple fiber plies, sometimes referred to as combination board or cylinder board. Often one or more of the plies consists at least partially of waste paper in order to reduce raw material costs.

As is well known in the art, the manufacture of multiple ply paperboard is accomplished using a cylinder machine. A cylinder is a large hollow rotatable roll covered with wire mesh and partially submerged in a tub or vat of pulp stock. As the wire rotates out of the vat, it carries with it a wet mat of fibers. Water from the mat is drained through the wire mesh and exits out an end of the rotating cylinder. As the fiber mat rotates to the top of the cylinder it is picked up by a horizontal felt pressed against the top of the cylinder by a press roll. The fiber mat is carried to the next cylinder where it is affixed to another ply. A cylinder machine typically consists of no more than eight cylinders.

In an alternative embodiment of the present invention, the paperboard comprises multiple plies, and the RF active adhesive is added only to the pulp stock used to make the outer ply or plies, thereby minimizing the amount of adhesive required. A cylinder machine may be used for this purpose.

For illustration purposes, the invention will now be described with respect to the making of a spirally wound container.

A spirally wound paperboard container would typically have a structural or bodywall layer made of paperboard, a separate polyfoil inner liner, and an outer label, although, for the purposes of the invention, it is not necessary to have a liner or outer label. The paperboard web is advanced toward a shaping mandrel where the web is formed into a cylinder having one or more plies. In conventional practice, prior to winding, the paperboard web is advanced through an adhesive applicator which applies adhesive to at least one side of the web or along at least one marginal edge of the web so that the web adheres to itself as it is wound around the mandrel.

However, in a departure from conventional practice, the web is not coated with adhesive. Instead, just prior to and/or during winding, the RF active adhesive impregnated web is exposed to RF energy by passing the web between two opposing plates or electrodes, which excites the RF active adhesive within the web, causing the generation of heat sufficient to soften the adhesive within the sheet. As a result, the web becomes tacky and is capable of being adhered to itself or another substrate.

Next, the web is wound around a stationary mandrel in helical fashion to form a tube, according to conventional practice. The tube is advanced along the mandrel by a conventional winding belt, which is stretched between a pair of opposed pulleys. As described in U.S. Pat. No. 6,296,600, incorporated herein by reference, as the paperboard web is further wrapped around the mandrel and advances back under the mandrel, after one complete revolution, one edge is brought into overlapping contact with the opposing edge of the ensuing portion of the web as the ensuing portion first comes into contact with the mandrel. The opposing edges of the web become abutted together and the still soft adhesive adheres the edges together to form a spirally wound tube which advances along the mandrel.

As the tube advances along the mandrel the RF active adhesive hardens. The continuous tube is then cut to a desired length at a cutting station and removed from the mandrel.

Although the invention has been described with respect to the manufacture of a spirally wound cylindrical container, it should be understood that the invention may be used to bond together two or more paperboard sheets to make almost any type of paperboard structure, including convolutely wound tubular containers; structural support posts of the type disclosed in U.S. Pat. Nos. 4,482,054, 5,267,651 and 5,593,039; and non-wound paperboard structures, such as the paperboard side panels that form part of the appliance shipping container disclosed in U.S. Pat. No. 4,811,840.

Other modifications and alternative embodiments of the invention are contemplated which do not depart from the spirit and scope of the invention as defined by the foregoing teachings and appended claims. It is intended that the claims cover all such modifications that fall within their scope.

What is claimed is:

1. A method of producing a paperboard structure, the method comprising the steps of:

adding a radio frequency active adhesive to paperboard pulp stock;

forming a sheet from the pulp stock;

exposing the sheet to RF energy to generate heat sufficient to cause the adhesive in the sheet to soften;

arranging one or more of the sheets into at least partially overlapping relationship; and allowing the adhesive to harden, thereby affixing the overlapped sheets together.

2. The method of claim 1 wherein the arranging step comprises winding the sheet around a shaping mandrel in helical fashion to form a tube.

3. The method of claim 2 wherein, as the sheet is wound around the mandrel, one edge of the sheet is brought into overlapping contact with the opposing edge of an ensuing portion of the sheet, the opposing edges become abutted together, and the adhesive adheres the edges together.

4. The method of claim 1 wherein the arranging step comprises convolutely winding the sheet around a shaping mandrel to form a tube.

5. The method of claim 1 wherein the adhesive is selected from the group consisting of phenol-formaldehyde resin, ethyl vinyl acetate (EVA), melamine-formaldehyde resin, polyethylene terpthatate (PET), polyvinyl acetate (PVA), and silicones.

6. A method of producing a multiple-ply paperboard sheet for dry bonding, the method comprising the steps of:

providing a first batch of paperboard pulp stock;

adding a radio frequency active adhesive to a second batch of paperboard pulp stock;

forming a first sheet from the first batch of pulp stock;

forming an RF adhesive impregnated sheet from the second batch of pulp stock; and affixing one sheet to the other by arranging the sheets into an overlapping relationship and exposing the RF adhesive impregnated sheet to RF energy.

7. The method of claim 6 wherein the sheets are formed using a cylinder machine.

8. The method of claim 7 further comprising the steps of forming a third sheet from paperboard pulp stock, and affixing the third sheet to the first sheet.

* * * * *